United States Patent [19]

Nakajima et al.

[11] 4,048,548
[45] Sept. 13, 1977

[54] STEPPING MOTOR

[75] Inventors: Fumio Nakajima, Tokyo; Takayasu Machida, Iruma; Kenji Yamada, Koganei, all of Japan

[73] Assignee: Citizen Watch Company Limited, Tokyo, Japan

[21] Appl. No.: 644,262

[22] Filed: Dec. 24, 1975

[30] Foreign Application Priority Data

Sept. 27, 1975 Japan .............................. 50-116617

[51] Int. Cl.$^2$ .......................................... H02K 29/00
[52] U.S. Cl. .................................... 318/138; 318/696; 310/40 MM; 310/49 R; 310/162
[58] Field of Search ............................. 318/138, 696; 310/40 MM, 49, 162–164; 58/23 D

[56] References Cited

U.S. PATENT DOCUMENTS

| | | | |
|---|---|---|---|
| 3,132,558 | 5/1964 | Wymann | 310/49 R |
| 3,597,915 | 8/1971 | Aizawa | 310/49 R |
| 3,949,251 | 4/1976 | Takatsuki | 310/49 R |
| 3,978,651 | 9/1976 | Yoshimo | 310/40 MM |
| 3,979,616 | 9/1976 | Stechmann | 310/49 R |
| 3,989,967 | 11/1976 | Kikuyama et al. | 310/162 X |

*Primary Examiner*—Gene Z. Rubinson
*Attorney, Agent, or Firm*—Frank J. Jordan

[57] ABSTRACT

A stepping motor for use in an electronic timepiece which has a permanent magnet rotor and a stator provided with a driving coil. The stator is comprised of stator pole pieces each having assymetric portions which provide primary and secondary magnetic paths, respectively, whereby two static equilibrium positions are provided. The rotor may be stable at either one of these static equilibrium positions by controlling the supply of two-phase pulses to the driving coil so that the rotor may be rotated in normal or reverse direction.

2 Claims, 7 Drawing Figures

STEPPING MOTOR

This invention relates in general to stepping motors and, more particularly, to a reversible stepping motor for use in an electronic timepiece.

As is well known, stepping motors, also called pulse motors, are becoming increasing employed in industrial applications due to the introduction of digital pulse techniques. Typical one of these applications involves electronic timepieces having electro-mechanical timekeeping movements which are driven by the stepping motors. Such motors are unidirectional and typically 180° per input pulse. The stepping motor is usually comprised of a rotor and a stator provided with a driving coil. The stator has two pole pieces which are displaced or offset from each other with respect to a central axis between the pole pieces. With this arrangement, it is difficult to assemble the stator pole pieces so as to provide a stable operation of the rotor. In another expedient, the stator pole pieces are integrally formed with one another and shaped by stamping. This requires the provision of a complicated die for the specific stator pole pieces. In addition, the stepping motor of this type can not be driven in the reverse direction due to its inherent construction.

It has heretofore been proposed to provide various types of reversible stepping motors for use in the electronic timepieces. Each of these stepping motors is usually comprised of more than three stator pole pieces and two driving coils which provide a larger construction, and is not suited for the electronic timepieces in which a minimum spacing for the stepping motor is required. Since, further, the stepping motor of this type is driven by four-phase pulses, a driver circuit is necessarily complicated in construction.

It is, therefore, an object of the present invention to provide an improved stepping motor which overcomes the shortcomings encountered in the prior art.

It is another object of the present invention to provide an improved stepping motor which is specifically suited for use in an electronic timepiece.

It is another object of the present invention to provide an improved stepping motor which is simple in construction and easy to assemble.

It is still another object of the present invention to provide an improved stepping motor which can be driven in a normal or reverse direction.

It is still another object of the present invention to provide an improved stepping motor which has a single driving coil by which a rotor is rotated in a normal or reverse direction in a simple manner.

It is a further object of the present invention to provide an improved stepping motor which has a single driving coil and a driver circuit arranged to apply two-phase pulses to the driving coil so as to rotate a rotor in a normal or reverse direction.

It is a further object of the present invention to provide an improved stepping motor which has a single driver circuit comprised of a control switch means to control the supply of two-phase pulses to a driving coil.

These and other objects, features and advantages of the present invention will become more apparent from the following description when taken with the accompanying drawings, in which:

FIGS. 4 and 5 are schematic views of a preferred embodiment of a stepping motor according to the present invention, in which FIG. 4 shows a mode of normal rotation of a rotor and FIG. 5 shows a mode of reverse rotation of the rotor;

Figure 1:
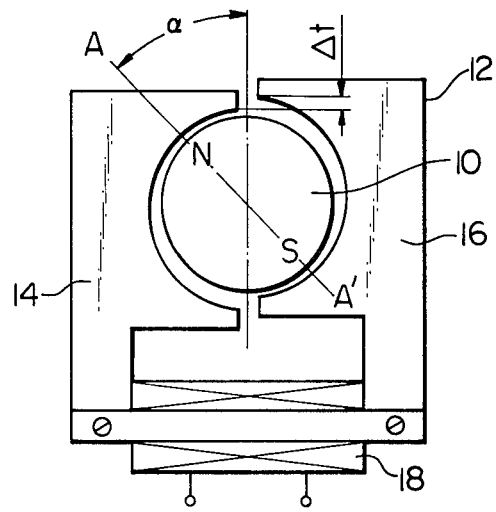
FIG. 1 is a schematic view of a conventional stepping motor used in an electronic timepiece.

Referring now to FIG. 1, there is shown an example of a conventional stepping motor for use in an electronic timepiece. As shown, the stepping motor comprises a permanent magnet rotor 10, and a stator 12 including stator pole pieces 14 and 16 which are driven by a driving coil 18. The stator pole pieces 14 and 16 are arranged such that the centers of radius of curvature are offset from each other by a distance $\Delta t$ and, thus, the rotor 10 may be stable on an axis A-A' of static equilibrium. Consequently, the rotor 10 is rotated in a single direction by applying the alternating current pulses to the driving coil 18 and can not rotate in the reverse direction. Another drawback is encountered with this prior art in that it is difficult to accurately assemble the stator pole pieces.

Figure 2:
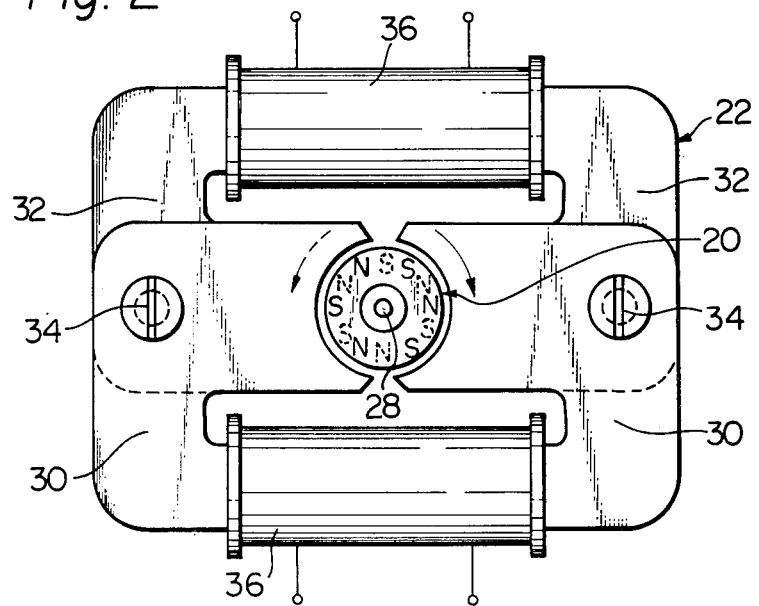
FIG. 2 is a schematic view of another conventional stepping motor used in an electronic timepiece.
Figure 3:
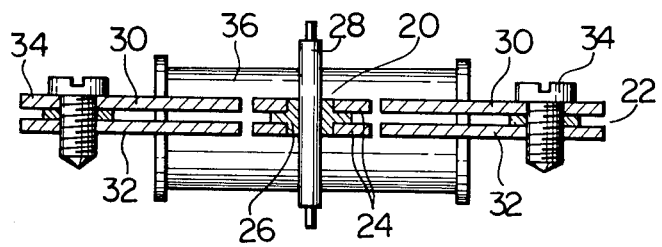
FIG. 3 is a cross section of the stepping motor shown in FIG. 2.

FIGS. 2 and 3 show an example of a conventional reversible stepping motor. As shown, the reversible stepping motor is comprised of a rotor 20 and a stator 22. The rotor 20 includes a pair of magnets 24 and a rotor 26, made of a magnetic material, which are centered and fixed on a shaft 28. The stator 22 comprises four stator pole pieces 30 and 32, which are partly overlapped with each other and magnetically connected to each other by screws 34. Each pole piece is driven by a driving coil 36 wound around a portion of the pole piece. With this construction, the rotor 20 can be rotated in a normal or reverse direction by applying four-phase pulses to the driving coils 36. However, a drawback is encountered with this construction in that the stepping motor is largely sized due to its inherent construction. Thus, the stepping motor of this type is not suited for use in an electronic timepiece such as wrist watch in which a narrow spacing is required for mounting the stepping motor.

Figure 4:
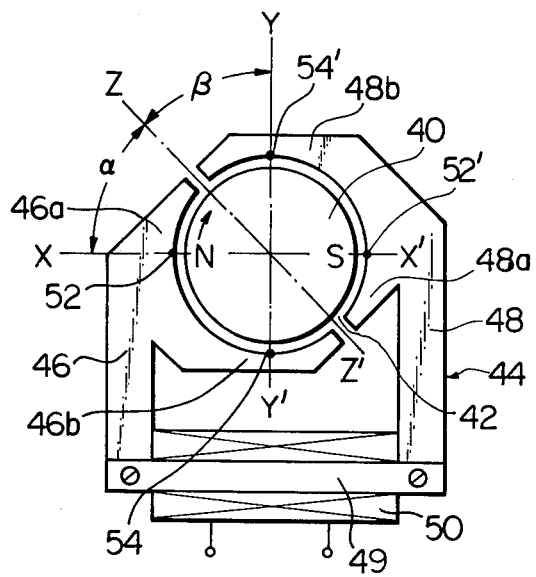
Figure 5:
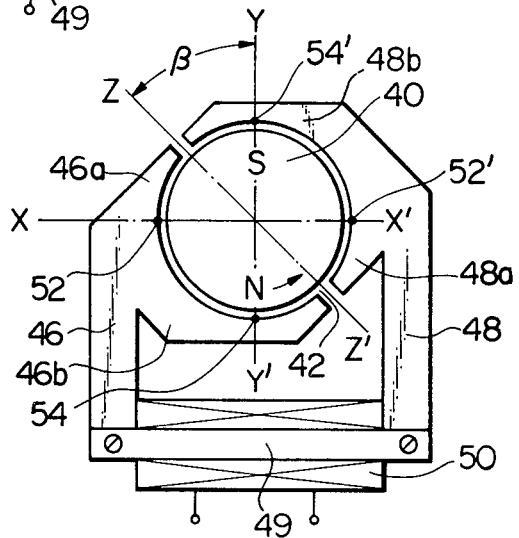

The present invention contemplates to provide an improved reversible stepping motor which is simple in construction and easy to manufacture. A preferred embodiment of a stepping motor implementing the above concept is illustrated in FIGS. 4 and 5. In this illustrated embodiment, the stepping motor is comprised of a permanent magnet rotor 40 which is rotatably mounted in an air gap 42 provided by a stator 44. The stator 44 comprises stator pole pieces 46 and 48, which are magnetically connected to each other by a magnetically conductive elongated member 49. A driving 50 is wound around the magnetically conductive elongated member 49 and energized in a manner as will be described in detail hereinafter. The stator pole pieces 46 and 48 are arranged such that there are two distinct flux paths passing from the stator pole pieces through the rotor 40, one flux path having a higher flux concentration than the other. More specifically, the stator pole piece 46 has first and second portions 46a and 46b which are assymetric and which provide primary and secondary magnetic flux paths of different lengths, respectively. The primary magnetic flux path of the first portion 46a provides a lower reluctance to the flux path and coincides with an axis X-X' of a first static equilibrium at a first static equilibrium point 52 for the normal rotation of the rotor. The secondary magnetic flux path provides a higher reluctance to the flux path and coincides with an axis Y-Y' of a second static equilibrium at a second static equilibrium point 54 for the reverse rotation of the rotor. Similarly, the stator pole piece 48 has first and second portions 48a and 48b which are assymetric and which provide primary and secondary magnetic flux paths, respectively. The primary magnetic flux path of the first portion 48a provides a lower reluctance to the flux path and coincides with the axis X-X' of the first static equilibrium at the first static equilibrium point 52'. The secondary magnetic flux path of the second portion 48b provides a higher reluctance to the flux path and coincides with the axis Y-Y' of the second static equilibrium at the second static equilibrium point 54'. It will thus be seen that there is at least one static equilibrium point at a position substantially symmetric with respect to a central axis Z-Z' between the stator pole pieces. The stator pole pieces 46 and 48 thus constructed are arranged such that the first portions of each stator pole piece are diametrically opposite each other. It will also be understood that the rotor 40 will be stable on the axes of the first and second static equilibriums for the normal and reverse rotations of the rotor.

In FIG. 4, the rotor 40 is shown as being stable on the axis X-X' for the normal rotation of the rotor 40, i.e., the clockwise rotation of the rotor. In this condition, a main magnetic flux generated by the permanent magnet rotor 40 passes across the air gap 42 through the first static equilibrium point 52 in the first portion 46a to the stator pole piece 46, through the elongated member 49 and the stator pole piece 48 to the first static equilibrium point 52' in the first portion 48a, back across the air gap 42 into the rotor 40 to complete the magnetic circuit in which a flux reluctance is minimum. As the rotor 40 is rotated counter-clockwise as viewed in FIG. 4, the north pole of the rotor 40 is moved away from the first static equilibrium point 52 toward the second static equilibrium point 54. At the same time, the south pole of the rotor 40 is moved away from the first static equilibrium point 52' toward the second static equilibrium point 54'. In this instance, the flux path is elongated and, therefore, the flux reluctance increases. Consequently, a portion of the main magnetic flux begins to pass theough the secondary magnetic flux path in the second portion 46b of the stator pole piece 46, across the air gap 42, through the rotor 40, back across the air gap 42 into the secondary magnetic flux path in the second portion 48b of the stator pole piece 48, and the rotor 40 is stable in a position where the magnetic flux passing through the axis of the second static equilibrium is balanced with that passing through the axis of the first static equilibrium, i.e. in the position represented by the second static equilibrium points 54 and 54' as shown in FIG. 5.

Figure 6:
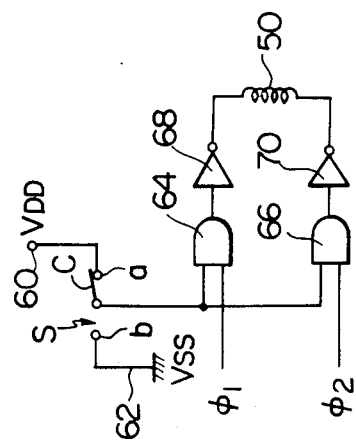
FIG. 6 is a view showing an example of a driver circuit for the stepping motor shown in FIGS. 4 and 5.

FIG. 6 shows an example of a driver circuit for the driving coil 50 forming part of the stepping motor shown in FIGS. 4 and 5. As shown, the driver circuit includes a control switch S provided between a positive supply terminal 60 and other or grounded side 62 of the power supply. The control switch S has a stationary contact $a$ connected to the positive supply terminal 60, a stationary contact $b$ connected to the grounded side 62 of the power supply, and a movable contact $c$ engageable with one of the stationary contacts $a$ and $b$. The movable contact $c$ is connected to inputs of AND gates 64 and 66, to which clock pulses $\phi_1$ and $\phi_2$ are applied. The AND gate 64 is connected at its output to an inverting amplifier 68 which in turn is connected to one terminal of the driving coil 50 of the stepping motor. Similarly, the AND gate 66 is connected at its output to an inverting amplifier 70 which in turn is connected to the other terminal of the driving coil 50.

Figure 7:
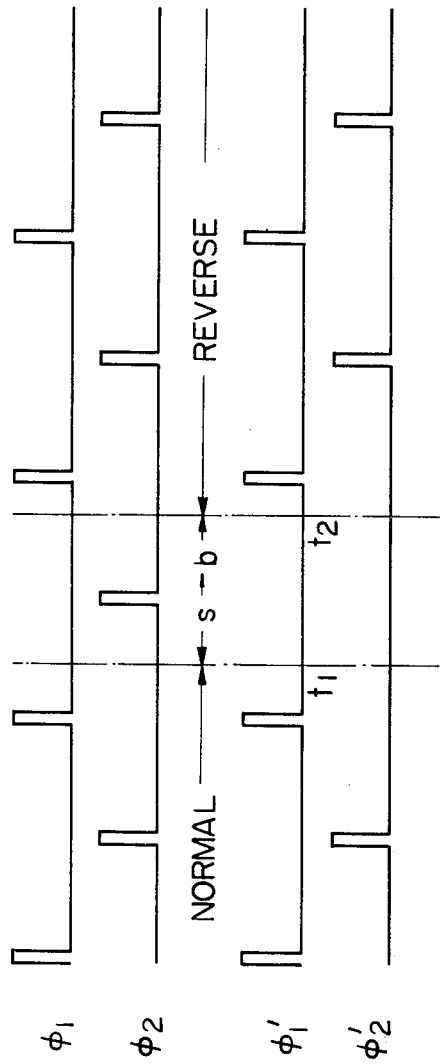
FIG. 7 is a wave diagram of clock pulses generated by the circuit diagram shown in FIG. 6.

If the clock pulse $\phi_2$ shown in FIG. 7 is applied to the driving coil 50 of the stepping motor such that the stator pole piece 46 has a north polarity while the stator pole piece 48 has a south polarity when the rotor 40 is stable at the position shown in FIG. 4, the rotor 40 is caused to rotate stepwise at the angle of 180° in the normal direction, i.e. clockwise as viewed in FIG. 4. In this instance, the rotor 40 has a kinetic energy greater than the force of repulsion generated at the second static equilibrium points 54 and 54' when the rotor 40 passes therethrough. Consequently, the rotor 40 will continue to rotate without being affected by the repulsion forces generated at the second static equilibrium points 54 and 54' and finally stop at the position in which the north pole of the rotor 40 is closest to the first static equilibrium point 52' while the south pole of the rotor 40 is closest to the first static equilibrium point 52. In this manner, the rotor 40 is rotated in the normal direction by alternatively applying the clock pulses $\phi_1$ and $\phi_2$ to the driving coil 50 of the stepping motor.

In the state shown in FIG. 4, the stator pole piece 46 has the south pole while the stator pole piece 48 has the north pole by applying the clock pulse $\phi_1$ to the driving coil 50. In this condition, the rotor 40 is stable at the position in which the north pole is closest to the first static equilibrium point 52 and the south pole is closest to the first equilibrium point 52'. If, in this instance, the movable contact $c$ of the control switch S is brought into contact with the stationary contact $b$ for a predetermined time interval (T = $t_1 + t_2$), the AND gate 66 is inhibited and the clock pulse $\phi_2$ is not gated through the AND gate 66 as shown by the clock pulse $\phi'_2$ in FIG. 7. At a predetermined time instant $t_2$, if the movable contact $c$ is brought into contact with the stationary contact $a$, the clock pulse $\phi_1$ is gated through the AND gate 64 and again applied to the driving coil 50. In this condition, the stator pole pieces 46 and 48 are energized such that the stator pole piece 46 has the south polarity while the stator pole piece 48 has the north polarity. This causes a weak reverse torque to be impressed on the rotor 40, which is consequently rotated in the reverse direction, i.e., counter-clockwise as viewed in FIG. 5 until the rotor 40 is stopped at the position in which the north pole of the rotor 40 is closest to the second static equilibrium point 54 while the south pole of the rotor 40 is closest to the second static equilibrium point 54' as shown in FIG. 5. Under this condition, if the clock pulse $\phi_2$ is applied to the driving coil 40, the polarities of the stator pole pieces 46 and 48 are reversed and, therefore, the rotor 40 is caused to rotate stepwise at the angle of 180° in the reverse direction until the rotor 40 becomes stable at the second static equilibrium position in which the north pole of the rotor 40 is closest to the second static equilibrium point 54' while the south pole of the rotor 40 is closest to the second static equilibrium point 54. Subsequently, if the clock pulses $\phi_1$ and $\phi_2$ are alternatively applied to the driving coil 50, the rotor 40 is rotated stepwise at the angle of 180° in the reverse direction. Assume that the axis X-X' of the first static equilibrium is angled at the degrees of α with respect to an axis Z-Z' of a center between the stator pole pieces 46 and 48 and the axis Y-Y' of the second static equilibrium is angled at the degrees of β with respect to the axis Z-Z', and that the total angle is 90°, i.e., α + β = 90°, the rotation of the rotor 40 can be reversed by initially rotating the rotor 40 stepwise to a given static equilibrium position at a predetermined angle of about 90°. In other operation of the stepping motor, the rotor is rotated stepwise in either direction at the angle of 180°.

It will now be appreciated from the foregoing description that in accordance with the present invention a stepping motor has two static equilibrium positions whereby a rotor may be rotated in either direction with the use of a single driving coil. Thus, the stepping motor of the present invention can be manufactured in simple and compact construction in an easy fashion.

While the present invention has been shown and described with reference to a particular embodiment, it should be noted that the various changes or modifications may be made without departing from the scope of the present invention. Also, it should be noted that the stepping motor of the present invention has been described as being applied for an electronic timepiece by way of example only and is not limited thereto.

What is claimed is:

1. A stepping motor comprising:
   a permanent magnet rotor; and
   a stator including a driving coil and two stator pole pieces spaced from each other to provide an air gap within which said rotor is rotatably mounted, each of said stator pole pieces including asymmetric first and second portions, said first portions of each stator pole piece being arranged diametrically opposite each other with respect to a central axis between said stator pole pieces, said first and second portions including magnetic flux paths of different lengths whereby one of said portions has a higher flux reluctance to the flux path than the other, a static equilibrium point being provided on one of said first and second portions of each stator pole piece.

2. A reversible stepping motor comprising:
   a permanent magnet rotor;
   a stator including a driving coil and two stator pole pieces spaced from each other to provide an air gap within which said rotor is rotatably mounted, each of said stator pole pieces including asymmetric first and second portions one of which has a higher flux reluctance to the flux path than the other, said first portions of each stator pole piece being arranged diametrically opposite each other and including first static equilibrium points, for clockwise rotation of said rotor, provided at positions substantially symmetric with respect to a center of said stator pole pieces while said second portions of said each stator pole pieces have second static equilibrium points, for counter-clockwise rotation of said rotor; and
   a driver circuit connected to said driving coil, said driver circuit comprising circuit means for alternatively providing first and second output pulses to said driving coil for alternatively reversing the polarities of said stator pole pieces, and control switch means for selectively inhibiting said circuit means to interrupt the supply of one of said first and second output pulses within a predetermined time interval.

* * * * *